United States Patent

[11] 3,596,120

| [72] | Inventor | Frederick M. Potter<br>Little Silver, N.J. |
|---|---|---|
| [21] | Appl. No | 875,236 |
| [22] | Filed | Nov. 10, 1969 |
| [45] | Patented | July 27, 1971 |
| [73] | Assignee | The Bendix Corporation |

[54] OIL COOLED GENERATOR
6 Claims, 2 Drawing Figs.

[52] U.S. Cl. ................................................. 310/61, 310/65
[51] Int. Cl. .................................................. H02k 9/19
[50] Field of Search .......................... 310/54, 58, 59, 60, 61, 64, 65, 60.1, 269

[56] References Cited
UNITED STATES PATENTS

| 2,913,606 | 11/1959 | Guardiola | 310/64 X |
|---|---|---|---|
| | | FOREIGN PATENTS | |
| 170,946 | 10/1921 | Great Britain | 310/60.1 |
| 1,522,099 | 3/1968 | France | 310/61 |

*Primary Examiner*—D. F. Duggan
*Attorneys*—Plante, Hartz, Smith & Thompson and James M. Nickels

ABSTRACT: An oil cooled generator which utilizes oil flowing in channels between the pole body and the rotor field windings in intimate contact with the inner edge of the rotor field windings.

INVENTOR.
FREDERICK M. POTTER

ATTORNEY

OIL COOLED GENERATOR

CROSS-REFERENCE TO RELATED APPLICATIONS

The present invention is an improvement over copending U.S. application Ser. No. 734,728, now U.S. Pat. No. 3,480,810 filed June 5, 1968 for Oil Cooled Generator by Frederick M. Potter and assigned to The Bendix Corporation.

BACKGROUND OF THE INVENTION

1. Field of the Invention

The invention relates to the field of dynamo-electric machines utilizing fluid as a cooling medium.

2. Description of the Prior Art

The present invention is an improvement over those disclosed and claimed in U.S. Pat. No. 3,260,872 and copending U.S. application Ser. No. 734,728, now U.S. Pat. No. 3,480,1810 filed June 5, 1968. Both are assigned to The Bendix Corporation. Means are provided to flow cooling oil between the pole body and the rotor field windings.

SUMMARY OF THE INVENTION

A rotor assembly for an oil cooled generator which utilizes oil flowing from channels in the rotor shaft to cool the rotor windings by passing the oil through a channel in the pole body to openings between the pole body and the field windings where the oil passes over the inner edge of the field windings.

DESCRIPTION OF THE PREFERRED EMBODIMENT

Figure 1:
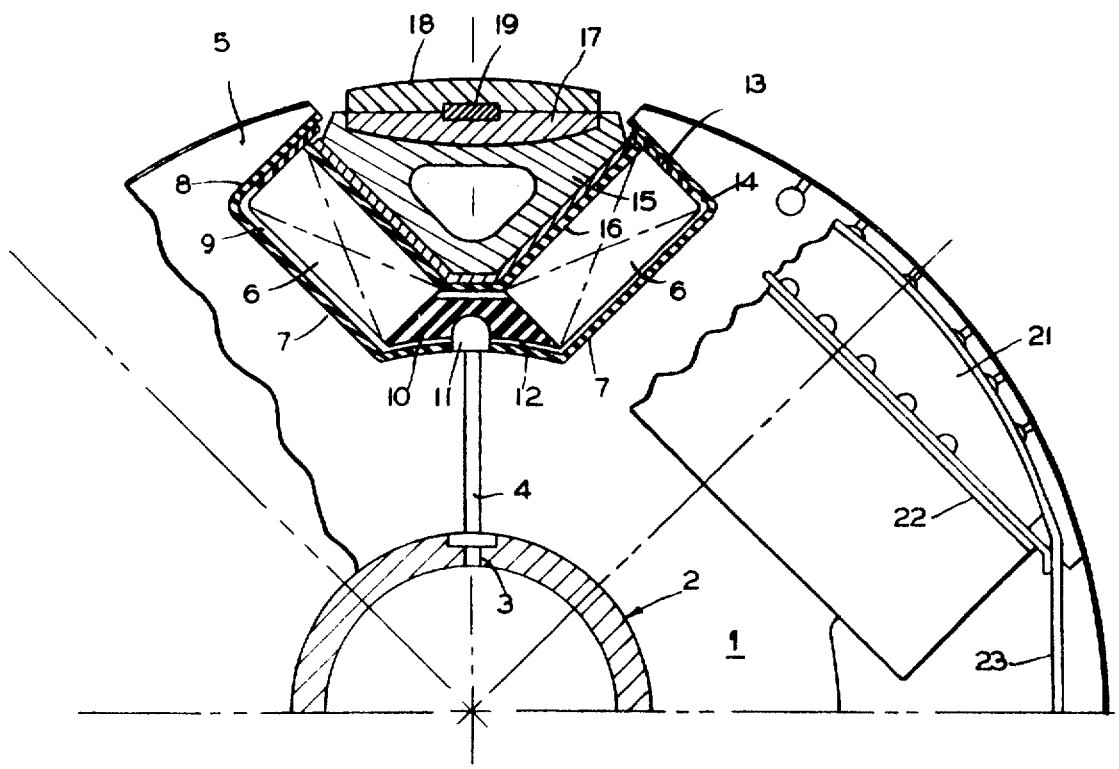
FIG. 1 is a partial section view of a rotor embodying the invention.
Figure 2:
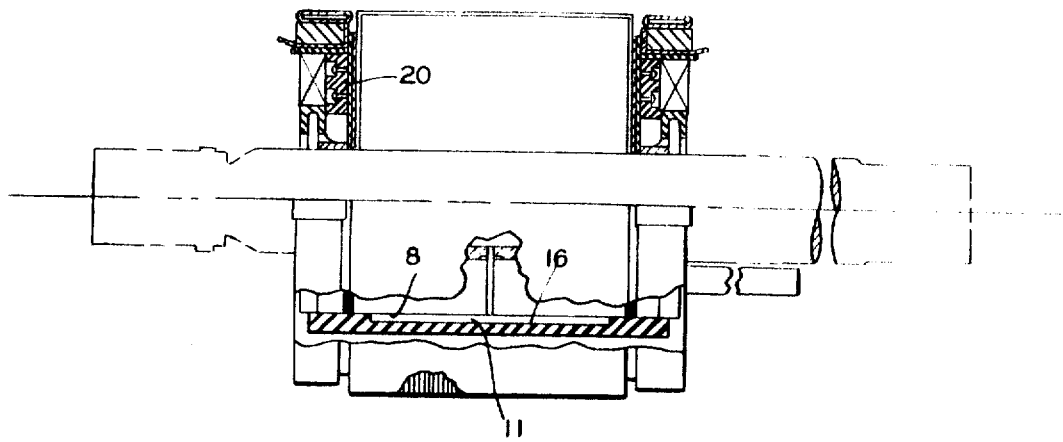
FIG. 2 is a partial cutaway side view of the rotor of FIG. 1.

Referring now to the drawing, a rotor is indicated generally by the numeral 1 and is of the type adapted to be used in an oil cooled generator such as described and claimed in copending U.S. application Ser. No. 734,728 now U.S. Pat. No. 3,480,810. In as much as the present invention is directed to the rotor, a detailed description of the generator will be omitted, reference may be had to the aforementioned application for details thereof.

The rotor 1 includes a shaft 2 which is the same as that described in U.S. Pat. No. 3,480,810. The shaft 2 has a plurality of openings 3 positioned to register with channels 4 in laminations 5 of the rotor 1. Field windings 6 are positioned on the laminations 5 and insulated therefrom by insulators 7. Spacers 8 support the windings 6 from the insulators 7 and form channels 9 between the windings 6 and the insulators 7.

Wedge winding supports 10 of a suitable material, for example a molded alkyd, are positioned between the windings 6. The wedge supports 10 have axially extending channels 11 adapted to register with the channels 4 in the laminations 5. Also the wedge winding supports 10 form channels 12 between themselves nd the insulators 7. An insulating spacer 13 forms a channel 14 along the top of the windings 6 connected to the channels 9.

Wedges 15 are positioned between the windings 6 and insulated therefrom by insulating members 16. The wedges 15 are maintained 75 place by tapered spacers 17 and 18 which coact with a retaining band 19. To retain the end turns of the windings 6 in place, insulating support members 20 are provided for wedge members 21. The wedge members 21 are insulated from the windings 6 by insulators 22. Retaining bands 23 secure the wedge members 21 against the windings 6 and support members 20.

In the operation, oil flowing the shaft as set forth in U.S. Pat. No. 3,480,810 enters channel 4 and into channel 11 from which centrifugal force causes the oil to flow radially outward through the channels 9 over the inner edges of the field coils 6. The oil passes through channels 14 extending substantially parallel to the rotor axis to each ends of the laminations 5 where it exits and sprays the bore of the stator end windings. Thus extremely good heat transfer is obtained by flowing oil directly over the field coil copper as compared to having to transfer the field coil heat through insulators. With the aforenoted arrangement the heat transfer from the field coils provides a two to one improvement over past arrangements. Test show that 2.1 watts per sq. inch per °C. rise are removed by the oil flowing directly over the windings.

Although only one embodiment of the invention has been illustrated and described various changes in the form and relative arrangement of the parts, which will now appear to those skilled in the art, may be made without departing from the scope of the invention.

What I claim is:

1. A rotor assembly for an oil cooled generator comprising a rotor shaft having a liquid coolant flowing therein, laminations mounted on said rotor shaft, field windings positioned on said laminations, means including winding supports forming a channel between said field windings and said laminations extending substantially parallel to the rotor axis to the ends of the laminations, a plurality of openings in said shaft, channels in said laminations in register with said openings, and means connecting said channels in said laminations to said channels between said field windings and said laminations to flow the coolant directly over said windings substantially axially to the ends of the laminations.

2. The combinations as set forth in claim 1 including means for said coolant to exit at the ends of said laminations after flowing over said windings.

3. The combination as set forth in claim 1 in which the means connecting the channels in said laminations to the channels between said laminations and said field windings include wedge winding supports.

4. The combination as set forth in claim 1 in which said first winding supports are insulation members.

5. The combination as set forth in claim 1 including means for retaining the end turns of said windings in position.

6. The combination as set forth in claim 5 in which said means include other winding supports and retaining bands.